(12) United States Patent
Wilson et al.

(10) Patent No.: US 7,779,818 B2
(45) Date of Patent: Aug. 24, 2010

(54) SYSTEM AND METHOD FOR PRIMING A FLUID SYSTEM

(75) Inventors: Douglas E. Wilson, Henry, IL (US);
Mark A. McElroy, Peoria, IL (US);
John A. Ward, Fairbury, IL (US);
Nathan T. Kelly, Peoria, IL (US); Lloyd A. Hendrix, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/027,115

(22) Filed: Feb. 6, 2008

(65) Prior Publication Data
US 2009/0013972 A1 Jan. 15, 2009

Related U.S. Application Data

(60) Provisional application No. 60/949,455, filed on Jul. 12, 2007.

(51) Int. Cl.
*F02M 37/00* (2006.01)
(52) U.S. Cl. ........................ 123/514; 123/516
(58) Field of Classification Search .............. 123/510, 123/511, 514, 516; 137/512.2, 516.27, 538
See application file for complete search history.

(56) References Cited

U.S. PATENT DOCUMENTS

| | | | | |
|---|---|---|---|---|
| 2,811,220 A | | 10/1957 | Winslow | |
| 3,027,913 A | * | 4/1962 | Chatham et al. | 137/484.2 |
| 3,384,242 A | | 5/1968 | Kudlaty et al. | |
| 3,967,635 A | * | 7/1976 | Sealfon et al. | 137/102 |
| 3,973,580 A | * | 8/1976 | Ueda | 137/101 |
| 4,171,712 A | * | 10/1979 | DeForrest | 137/513.5 |
| 4,339,917 A | * | 7/1982 | LaGrone | 60/39.281 |
| 4,372,855 A | | 2/1983 | Rosaen et al. | |
| 4,541,455 A | * | 9/1985 | Hauser | 137/516.27 |
| 4,625,701 A | | 12/1986 | Bartlett et al. | |
| 4,660,595 A | * | 4/1987 | Kuster et al. | 137/494 |
| 4,732,131 A | | 3/1988 | Hensel | |
| 4,984,554 A | | 1/1991 | Ariga et al. | |
| 5,039,284 A | * | 8/1991 | Talaski | 417/366 |
| 5,069,111 A | * | 12/1991 | Loffler et al. | 91/516 |
| 5,215,116 A | * | 6/1993 | Voss | 137/494 |
| 5,263,459 A | | 11/1993 | Talaski | |
| 5,372,718 A | | 12/1994 | Zebian | |
| 5,373,829 A | * | 12/1994 | Schuers et al. | 123/510 |
| 5,382,361 A | | 1/1995 | Brun | |

(Continued)

*Primary Examiner*—Thomas N Moulis
(74) *Attorney, Agent, or Firm*—Leydig, Voit & Mayer, Ltd.

(57) ABSTRACT

A system and method is provided for automatically priming a fuel system by bleeding/purging air or vapor therefrom. The system includes a bleed valve configured to automatically move between three positions in response to the pressure of the fuel in the system. When fuel pressure is in a first pressure range, the bleed valve automatically moves to a first-closed position for preventing fuel from draining to the fuel tank and thereby drawing air into the fuel system. When the fuel pressure moves to a second, higher pressure range, the bleed valve automatically moves to an open position for bleeding air out of the fuel system and into the tank, thereby priming the fuel system. When the fuel pressure moves to a third, still higher pressure range, the bleed valve automatically moves to a second-closed position so as to not interfere with the regulation of the pressure regulating valve.

18 Claims, 4 Drawing Sheets

U.S. PATENT DOCUMENTS

| | | | |
|---|---|---|---|
| 5,413,711 A | 5/1995 | Janik | |
| 5,462,658 A | 10/1995 | Sem | |
| 5,489,384 A | 2/1996 | Janik et al. | |
| 5,525,225 A | 6/1996 | Janik et al. | |
| 5,598,817 A * | 2/1997 | Igarashi et al. | 123/179.17 |
| 5,927,323 A * | 7/1999 | Kikuchi et al. | 137/514.5 |
| 6,058,912 A | 5/2000 | Rembold et al. | |
| 6,076,509 A | 6/2000 | Kyuma | |
| 6,199,533 B1 * | 3/2001 | Morris et al. | 123/299 |
| 6,270,659 B1 | 8/2001 | Bagci et al. | |
| 6,289,879 B1 | 9/2001 | Clausen et al. | |
| 6,352,085 B1 * | 3/2002 | Morita et al. | 137/516.27 |
| 6,527,947 B1 | 3/2003 | Channing et al. | |
| 6,615,807 B2 | 9/2003 | Rembold et al. | |
| 6,622,709 B2 | 9/2003 | Miller et al. | |
| 6,701,900 B1 | 3/2004 | Millar et al. | |
| 6,729,310 B2 | 5/2004 | Ekstam | |
| 6,755,625 B2 * | 6/2004 | Breeden | 417/298 |
| 7,147,110 B2 | 12/2006 | Clausen et al. | |
| 7,201,153 B2 | 4/2007 | Larsson | |
| 7,441,545 B1 * | 10/2008 | Fisher et al. | 123/467 |
| 7,469,712 B2 * | 12/2008 | Jansen | 137/516.27 |
| 7,503,341 B1 * | 3/2009 | Achterman | 137/498 |
| 2002/0189589 A1 * | 12/2002 | Kato et al. | 123/458 |
| 2004/0099587 A1 | 5/2004 | Schachtrup et al. | |
| 2004/0261772 A1 | 12/2004 | Larsson et al. | |
| 2005/0011497 A1 | 1/2005 | Larsson | |

* cited by examiner

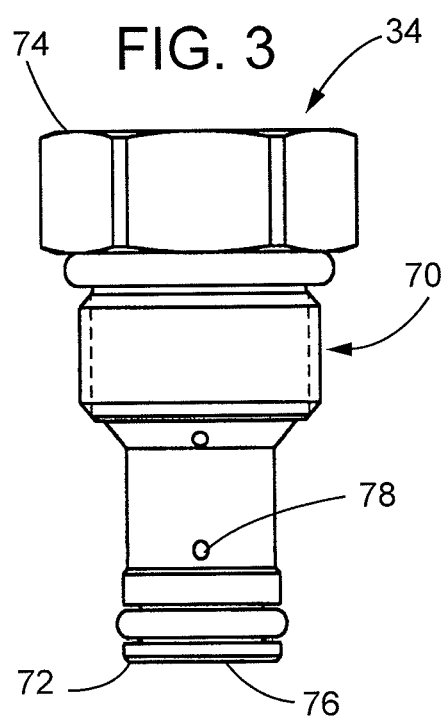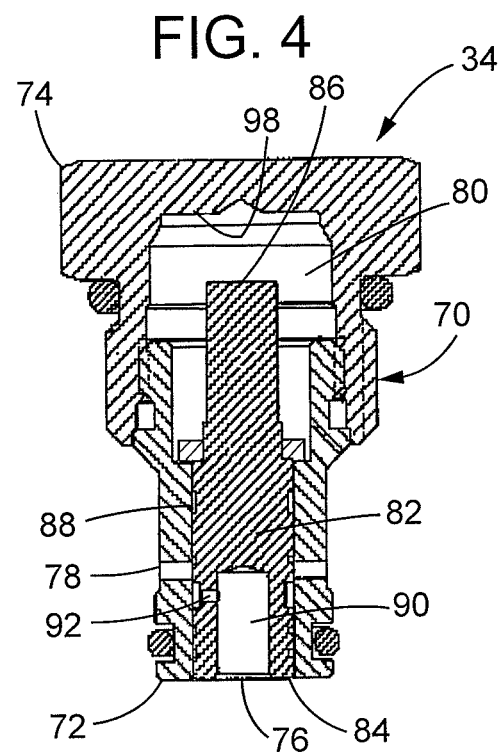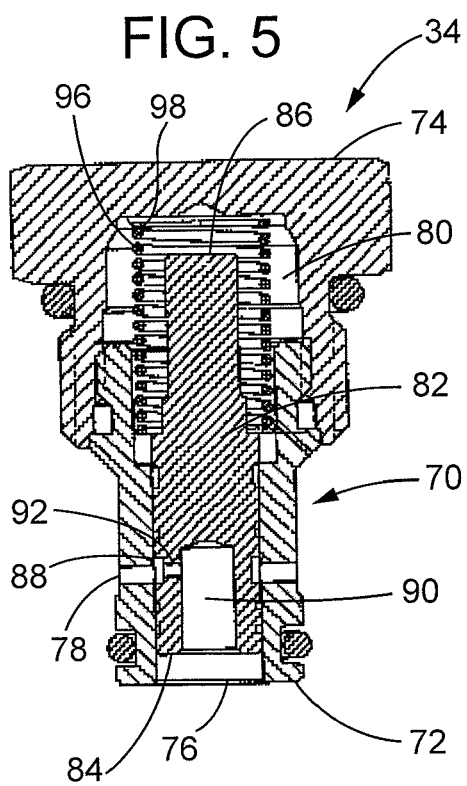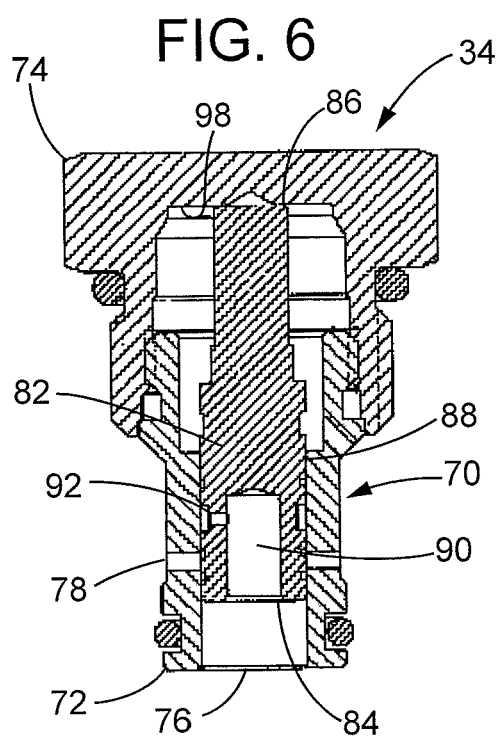

SYSTEM AND METHOD FOR PRIMING A FLUID SYSTEM

CROSS-REFERENCE TO RELATED APPLICATIONS

This application claims the benefit of U.S. Provisional Patent Application No. 60/949,455, filed Jul. 12, 2007, which is incorporated by reference.

TECHNICAL FIELD

This patent disclosure relates generally to a system and method for priming a fuel system and, more particularly, to a system and method for automatically priming a fuel system.

BACKGROUND

A typical fuel system for use with an internal combustion engine may include a liquid pump, a tank, a filter, a regulating valve, and fuel injectors, and a series of conduits that interconnect these components. The tank is located downstream from the liquid pump, whereas the filter, the regulating valve, and injectors are located upstream. The liquid pump has an inlet and an outlet and draws fuel from the tank into its inlet and discharges fuel from its outlet to the other components of the system.

Air or vapor can enter these fuel systems, causing the liquid pump to dry out and lose pressure. This pressure loss may render the pump unable to overcome restriction created by the resistance of the filter, the regulating valve, and the injectors. Thus, the pump becomes unable to pump fuel to the injectors. This may cause the engine to stall, operate inefficiently, or fail to start. When this occurs, the fuel system must be primed. Priming purges/bleeds air from the system, thereby rewetting the pump so that it can pump fuel through the filter and to the injectors.

Some known systems include hand pumps for pushing air out of the system and thereby priming the engine. Although these pumps can be effective, an operator does not always have the time or the strength to pump the number of strokes necessary for properly priming the engine. Additionally, it is often difficult to generate enough pressure with these pumps to open the regulator valve, which may be necessary for pushing air to the tank.

Other known systems include a bypass passage around the pressure regulating valve and/or the cylinder head. This bypass passage includes a restriction orifice that allows air to pass without restriction, but is relatively restrictive to liquid flow. Such a system is shown in portions of U.S. Pat. No. 6,701,900 to Millar et. al. entitled "Quick Priming Fuel System and Common Passageway Housing for Same." These systems, however, have shortcomings. For example, restriction orifices do not work well in fuel systems where the cylinder head is elevated above the rest of the fuel system. This is because most air introduced in the system rises past the restriction orifice, without entering the orifice, and this air continues rising until it reaches the cylinder head. Eventually, this risen air must pass through the cylinder head. The restriction orifice can also disadvantageously compete with the regulating valve. Because the restriction orifice is always open, it affects the fuel pressure when the regulating valve opens for regulating the fuel pressure. The restriction orifice can also allow fuel to drain back to tank when the engine is turned off. If there exists an opening to atmosphere at any point in the system, e.g., a tiny hole in a hose, the system will suck in air through that opening for filling the volume vacated by the drained fuel.

Another known system for priming is to utilize a manual valve in a bypass passage around a pressure regulator and/or the cylinder head. The manual valve is typically opened when the engine is off and is being primed via a hand priming pump. The manual valve is open to allow air to bleed out of the fuel system, and the system is primed when fuel is expelled from the valve. Upon noticing the appearance of fuel, the operator then closes the manual valve and cranks the engine to start in a conventional manner.

Other systems for priming utilize an open-close valve in a bypass passage around a pressure regulator and/or the cylinder head. This type of valve is open when the fuel pressure is between zero and a low pressure, e.g., the valve is open between 0 and 30 psi, for bleeding air to tank and thereby facilitating priming. The valve closes and remains closed once the fuel pressure rises above the low pressure threshold, e.g., the valve is closed when the fuel pressure is above 5 psi. This system of using an open-close valve is disadvantageous because the valve is open when the engine is off. This allows fuel to drain back to tank, possibly causing the system to suck in air.

The foregoing background discussion is intended solely to aid the reader. It is not intended to limit the present disclosure nor to limit or expand the prior art discussed. Thus, the foregoing discussion should not be taken to indicate that any particular element of a prior system is unsuitable for use within the present disclosure, nor is it intended to indicate that any element is essential in implementing the present disclosure.

SUMMARY OF THE DISCLOSURE

In one aspect, a system and method is provided for automatically priming a fuel system by bleeding/purging air or vapor therefrom. In the described system, a bleed valve automatically moves between three positions in response to the pressure of the fuel in the system. When fuel pressure is in a first pressure range, the bleed valve automatically moves to a first-closed position for preventing fuel from draining to the fuel tank and thereby sucking air into the fuel system. When the fuel pressure is in a second, higher pressure range, the bleed valve automatically moves to an open position for bleeding air out of the fuel system and into the tank, thereby priming the fuel system. When the fuel pressure is in a third, still higher pressure range, the bleed valve automatically moves to a second-closed position so as to not interfere with the regulation of the pressure regulating valve.

Additional and alternative features and aspects of the disclosed system and method will be appreciated from the following description.

BRIEF DESCRIPTION OF THE DRAWINGS

FIG. 3 is a front view of an automatic bleed valve, according to an embodiment the present disclosure, for use in the fuel filter assembly of FIG. 2;

FIG. 4 is a side cross-sectional view of the automatic bleed valve of FIG. 3 in a closed position;

FIG. 5 is a side cross-sectional view of the automatic bleed valve of FIG. 3 in an open position;

FIG. 6 is a side cross-sectional view of the automatic bleed valve of FIG. 3 in a closed position;

DETAILED DESCRIPTION

Figure 1:
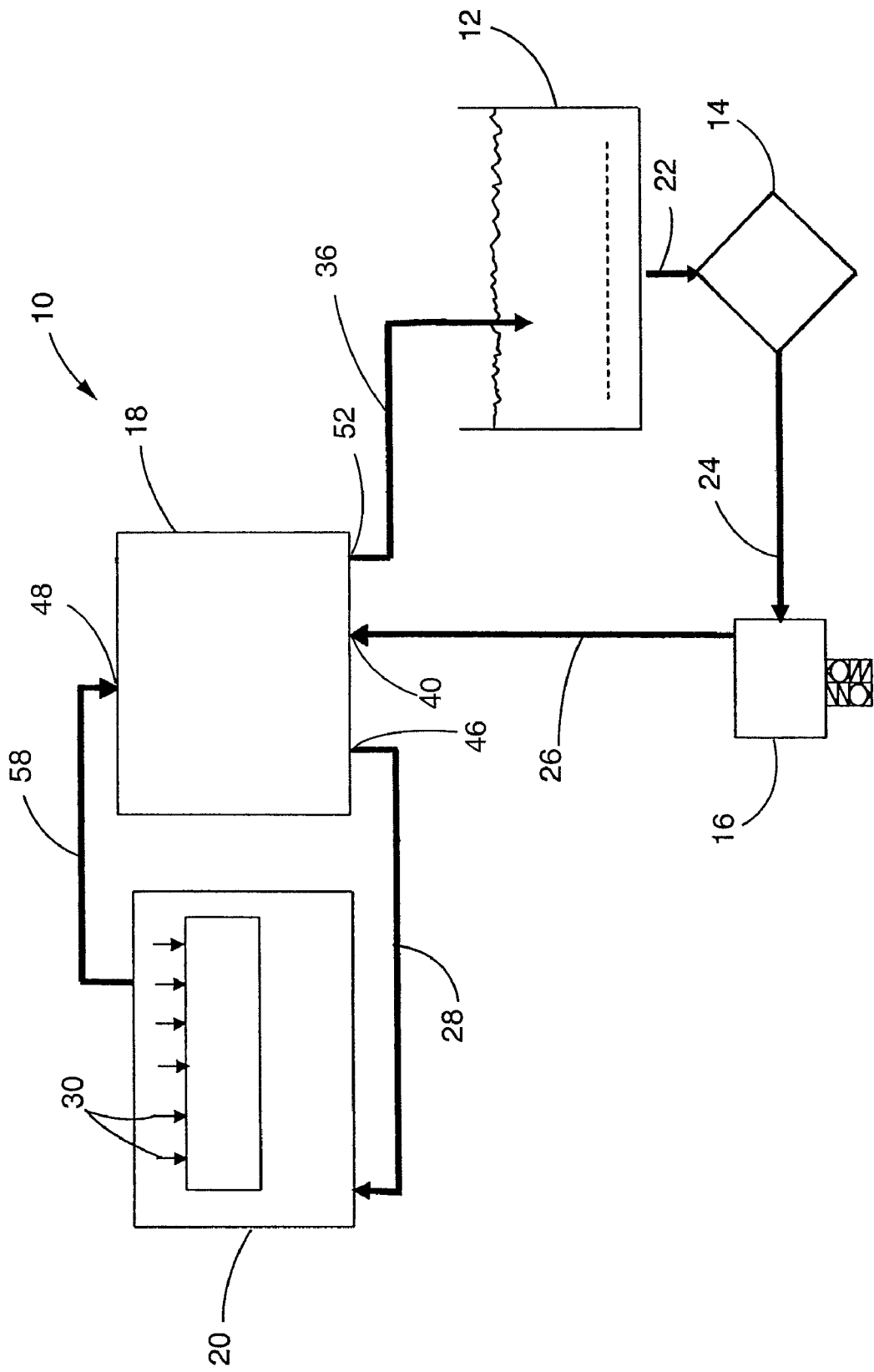
FIG. 1 is a schematic illustration of a fuel system according to an embodiment of the present disclosure.

FIG. 1 is a schematic view of a fuel system 10 for providing fuel to an internal combustion engine. The system 10 includes a fuel tank 12, a primary filter 14, a liquid pump 16, a secondary filter assembly 18, and cylinder head 20. The pump 16 draws fuel from the tank 12 into passage 22 and across the primary filter 14. Because the primary filter 14 can include a fine filter media, for example 120 micron or finer, the fuel pressure decreases as the fuel is drawn through the filter media. This pressure decrease can be significant enough to cause the fuel pressure to drop below the saturation pressure of fuel. When this occurs, entrained air escapes from the fuel and creates air bubbles in the filter 14. This is one way that has been discovered in which air can enter the fuel system 10. The air bubbles remain in the filter 14 during normal operation of the fuel system 10, i.e. when the engine is running. However, when the system 10 is not in operation, i.e., when the engine is off, the air bubbles may migrate through passage 24 and into the pump 16. Also, while the system 10 and the engine are not in operation, atmospheric air may enter the fuel system 10. For example, atmospheric air can enter the system 10 during a filter change or through a cracked line or a leaky connection. This atmospheric air may also migrate to the pump 16.

Air entering the pump 16 while the engine is off reduces the viscosity of the fuel in the pump 16. In this condition, when an engine start is attempted, internal leakage may occur in the pump 16 because its gears cannot effectively pump the reduced-viscosity fuel. If the internal leakage rate exceeds the output rate of the pump 16, then the pump 16 cannot provide flow to the system 10. Accordingly, the engine will fail to start because the pump 16 is incapable of performing its intended function of pumping fuel through passage 26 to the secondary filter assembly 18, and through passage 28 to the cylinder head 20, where fuel injectors 30 are mounted. Also, if air enters the pump 16, then the system loses pressure and the engine may start but stall soon thereafter. This occurs when there is enough fuel in the system for starting the engine, but the pump 16, which is contaminated with air, is unable to provide flow of additional fuel to the system for continued operation of the engine.

Figure 2:
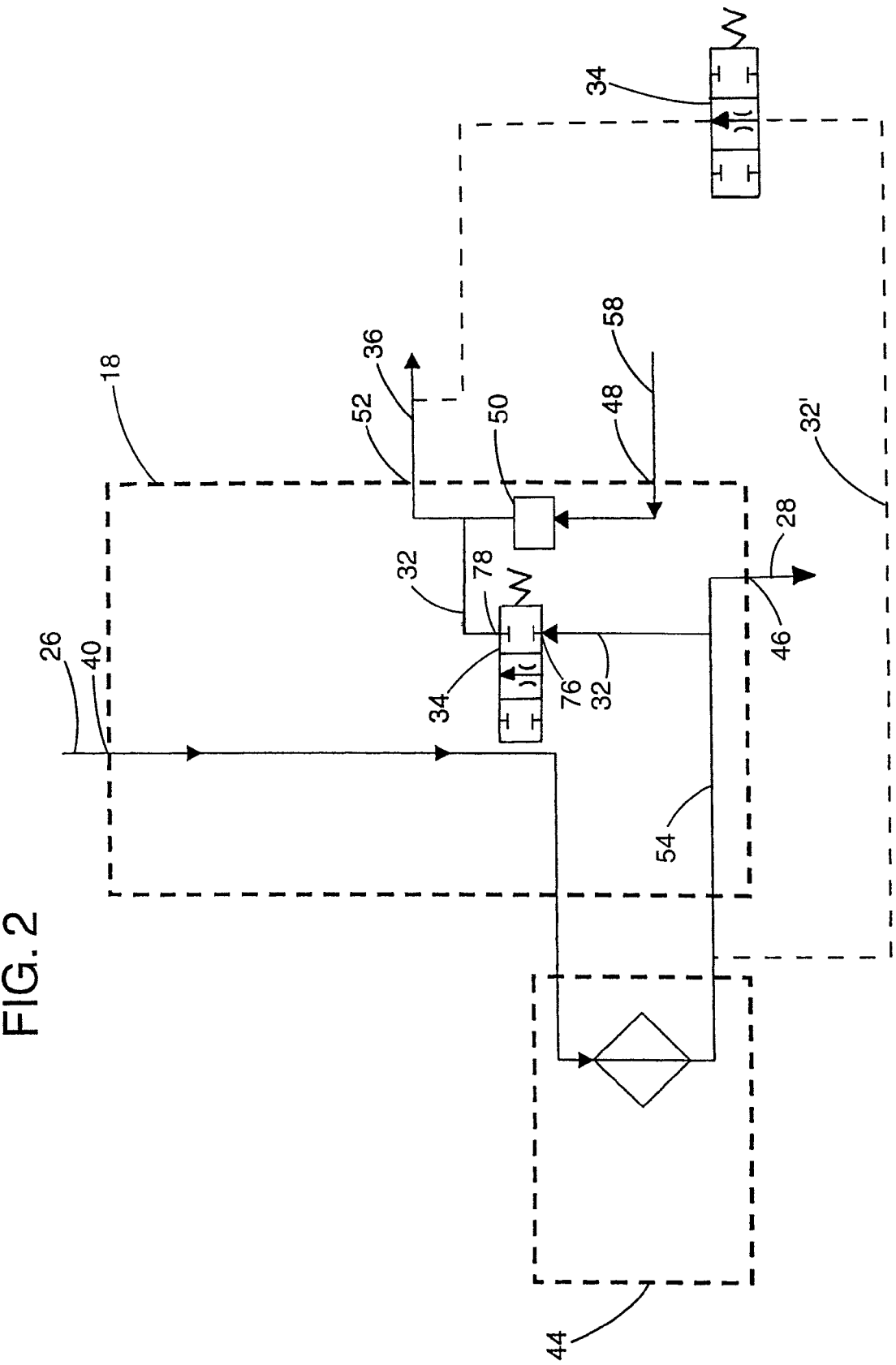
FIG. 2 is a schematic illustration of a fuel filter assembly, according to an embodiment of the present disclosure, for use in the fuel system of FIG. 1.

Referring to FIG. 2, the secondary filter assembly 18 is shown having a bypass passage 32. Passage 32 includes an automatic bleed valve 34 or a first valve for priming the fuel system 10 by opening and closing access to a drain passage 36. When the automatic bleed valve 34 is open, fuel and air can bypass the passage 28, which leads to the cylinder head 20, and flow back to tank 12 though drain passage 36. This reduces restriction on the pump 16, and enables the pump 16 to create flow and self-prime.

In addition to passage 32 and the automatic bleed valve 34, the secondary filter assembly 18 includes an inlet 40, a secondary fuel filter 44, an outlet 46 to the cylinder head, a return inlet 48 from the cylinder head, a pressure regulating valve 50 or a second valve, and an outlet 52 to the fuel tank. The assembly 18 further includes a passage 54 that extends between secondary filter 44 and outlet 46 to the cylinder head. In the illustrated embodiment, as shown in FIG. 2, passage 32 is an internal passageway formed in the filter base 18. One end of passage 32 is connected between the secondary filter 44 and outlet 46, while the other end is connected between regulating valve 50 and outlet 52. Accordingly, passage 32 enables fuel to bypass the pressure regulating valve 50.

It should be appreciated that one end of passage 32 can be connected anywhere between the pump 16 and the pressure regulating valve 50, while the other end can be connected anywhere between the pressure regulating valve 50 and the fuel tank 12. For example, one end of passage 32 can be connected between the second filter 44 and outlet 46, or between outlet 46 and inlet 48, or between inlet 48 and valve 50, while the other end can be connected anywhere between valve 50 and the tank 12. These embodiments, like the embodiment of FIG. 2, enable fuel to bypass the pressure regulating valve 50 and flow to the lower pressure area created when the bleed valve 34 opens bypass passage 32.

It should also be appreciated that passage 32 can be an external passage. For example, as illustrated by the phantom lines in FIG. 2, the passage 32' is an external passage having the automatic bleed valve 34 connected thereto.

Fuel enters the filter assembly 18 at either inlet 40 or 48. Inlet 40 receives fuel from tank 12. This fuel is pumped by the pump 16 from tank 12 and through passage 26. Once in the filter assembly 18, this fuel from tank travels to the secondary fuel filter 44 for additional filtering and then, if the bleed valve 34 is closed, passes through outlet 46 to the cylinder head. However, if the bleed valve 34 is open, this fuel from tank returns to tank via outlet 52. Inlet 48 receives return fuel from the cylinder head 20. This return fuel, which is excess fuel, passes from the cylinder head 20 through return passage 58 and then, if the pressure regulating valve 50 is open, exits the filter assembly via outlet 52 to tank.

The bleed valve 34 and the regulating valve 50 open and close in response to fuel pressure, and when either valve 34 or 50 is open, fuel returns to tank 12 via drainage passage 36. The bleed valve 34 opens in lower pressure ranges, while the pressure regulating valve 50 opens in higher pressure ranges. For example, in an embodiment, when the fuel pressure is in a first pressure range, e.g., between 0 psi and about 5 psi, the bleed valve 34 and the regulating valve 50 are both closed and no fuel exits through outlet 52 for draining back to tank 12. However, when the fuel pressure is in a second, higher pressure range, e.g., between about 5 psi and about 30 psi, the bleed valve 34 is open and the regulating valve 50 is closed. Accordingly, in this second pressure range, fuel can pass through the bleed valve 34 and outlet 52 for draining back to tank 12. When the fuel pressure is in a third, still higher pressure range, e.g., about 30 psi to about 60 psi, the bleed valve 34 and the regulating valve 50 are both closed and no fuel exits through outlet 52. When the fuel pressure exceeds the outer limit of the third pressure range, e.g., greater than about 60 psi, the regulating valve 50 is open and the bleed valve 34 is closed. In this case, fuel can pass through the regulating valve 50 and outlet 52 for draining to tank 12.

The regulating valve 50 opens and closes for keeping the fuel pressure of the system 10 at an ideal operating pressure. In an embodiment, the ideal operating pressure may be about 60 psi. To keep the fuel pressure at 60 psi, the regulating valve 50 remains closed when the fuel pressure is at or below 60 psi and opens when the fuel pressure exceeds 60 psi. When the regulating valve 50 is open, the fuel pressure remains relatively constant or decreases because fuel can bypass the cylinder head 20 and drain back to the tank 12. The valve 50 will find a balance between opened and closed to maintain fuel pressure near 60 psi. Accordingly, the regulating valve 50 opens and closes for maintaining the fuel pressure of the system 10 at an ideal or pre-established operating pressure.

Because the regulating valve 50 does not open until the fuel pressure reaches the pre-determined operating pressure, the pump 16, suffering from internal leakage caused by the reduced-viscosity fuel, is unable to generate enough flow and increase the fuel pressure enough to open the regulating valve 50, which would bleed air through passage 36 to tank 12. Accordingly, the system 10 is unable to prime and the engine will stall or fail to start because the pump 16, having reduced-viscosity fuel therein, is unable to overcome system restriction and provide flow in the system 10. However, opening the bleed valve 34 reduces system restriction on the pump 16, thereby enabling the pump 16 to create flow. This is because when the bleed valve 34 is open, fuel can bypass the pressure regulating valve 50 and the cylinder head 20, which are high restriction areas having high pressure, and drain to tank 12, which is a lower restriction area having lower pressure.

In the fuel system 10 of the present disclosure, if the pump 16 loses pressure, the fuel pressure in the system will eventually drop below an ideal operating-range. This drop in the fuel pressure of the system will trigger the opening sequence of the bleed valve 34. Accordingly, the bleed valve 34 will open and reduce restriction on the pump 16, thus enabling the pump 16 to push the air through passage 36 to the tank 12. Once the air is expelled from the pump 16 and the rest of the system 10, the pump 16 is able to create flow and increase the fuel pressure. This increase in fuel pressure will eventually cause the bleed valve 34 to close, enabling the pressure regulating valve 50 to regulate the system 10 during normal operation.

The operating sequence of the automatic bleed valve 34 will now be described in more detail. The bleed valve 34 is configured to close and remain closed when the fuel pressure is in the first pressure range. Typically, during this pressure range, the engine is off. The automatic bleed valve 34 is closed when the engine is off to prevent fuel from entering passage 36 and draining to tank 12 because, if fuel does drain to tank, the system 10 may ingest air from the atmosphere to replace the volume vacated by the drained fuel.

The bleed valve 34 is further configured to open when the fuel pressure is in the second, higher pressure range, in which air and vapor are often present in the fuel. Accordingly, the bleed valve 34 opens to permit fuel, having air or vapor therein, to bypass the cylinder head 22 and return to the tank 12 via return 36. This reduces the restriction on the transfer pump 16, enabling it to flush any air or vapor out of the system 10. Once the air and vapor are pushed out of the pump 16 and the rest of the system 10, the pump 16 is able to provide flow and increase the fuel pressure to the third, still higher pressure range. When this occurs, the bleed valve 34 is configured to close and remain closed until the pressure drops to the second pressure range. In other words, the bleed valve 34 is closed when the fuel pressure exceeds the outer limit of the second pressure range. Closing the bleed valve 34 at such pressures prevents the bleed valve 34 from compromising the function of regulating valve 50. That is, when the fuel pressure rises above the ideal operating pressure, e.g., about 60 psi, the regulating valve 50 opens to reduce the fuel pressure, and if the bleed valve 34 were to open in this pressure range, it would interfere with the regulation of the regulating valve 50.

FIGS. 3-6 illustrate an embodiment of the automatic bleed valve 34. The bleed valve 34 is in a first-closed position in FIG. 4, an open position in FIG. 5, and a second-closed position in FIG. 6. The illustrated bleed valve 34 includes a valve body 70 having a first end 72 and a second end 74. An inlet 76 is formed in the first end 72, and an outlet 78 is formed in a side portion of the valve body 70. It should be appreciated that other outlets 78 may be formed at various locations in the body 70. The inlet 76 is in fluid communication with passage 54 of the secondary filter assembly 18, and the outlet 78 is in fluid communication with drain passage 36, which leads to the fuel tank 12. The valve body 70 includes a chamber 80 and a first plunger 82 slidably positioned therein. The first plunger 82 has first and second ends 84, 86, an outer surface 88, a bore 90, and a passage 92. It should be appreciated that the first plunger 82 can have more than one passage 92. The bore 90 is formed in the first end 84 of the first plunger 82 and is in fluid communication with the inlet 76 of the valve body 70. The passage 92 extends between the bore 90 and the outer surface 88 of the first plunger 82 and, as shown in FIG. 5, when the passage 92 is inline with the outlet 78, the inlet 76 and the outlet 78 are in fluid communication with each other and the bleed valve 34 is in the open position. On the other hand, as shown in FIGS. 4 and 6, when the passage 92 is not inline with the outlet 78, the bleed valve 34 is in either the first- or second-closed position.

A first biasing spring 96 is disposed in the chamber 80, near the second end 74 of the valve body 70, as shown in FIG. 5. The first spring 96 is generally positioned between a top portion 98 of the chamber 80 and the second end 86 of the plunger 82. This arrangement enables the spring 96 to bias the plunger 82 toward the first end 72 of the valve body 70. The plunger 82 moves between positions in response to changes in the fuel pressure at the inlet 76. It should be appreciated that the fuel pressure in passages 54 and 32 is substantially the same as the fuel pressure at the inlet 76. As fuel pressure at the inlet 76 increases, the spring 96 compresses and the plunger 82 retracts into the chamber 80, toward the second end 74 of the valve body 70. Likewise, as fuel pressure at the inlet 76 decreases, the biasing spring 96 relaxes and the plunger 82 moves toward the first end 72 of the valve body 70.

As shown in FIG. 4, when fuel pressure at the inlet 76 is in the first pressure range, the first end 84 of the plunger 82 is generally flush with the first end 72 of the valve body 70, and the spring 96 (not shown in FIG. 4) is generally relaxed. In this condition, the bleed valve 34 is in the first-closed position because the passage 92 is positioned axially below, and out of fluid communication with, the outlet 78. As shown in FIG. 5, when the fuel pressure at the inlet 76 increases to the second pressure range, the first spring 96 is contracted and the first plunger 82 is retracted into the chamber 80. In this condition, the passage 92 is inline with the outlet 78, and fluid may flow from the inlet 76 to the outlet 78 by-way-of the passage 92. Accordingly, the bleed valve is in the open position when fuel pressure at the inlet 76 is in the second pressure range. As shown in FIG. 6, when fuel pressure at the inlet 76 increases to the third pressure range and above, the spring 96 is further contracted and the plunger 82 is further retracted into the chamber 80. In this condition, the bleed valve 34 is in the second-closed position because the passage 92 is positioned axially above, and out of fluid communication with, the outlet 78.

Figure 7:
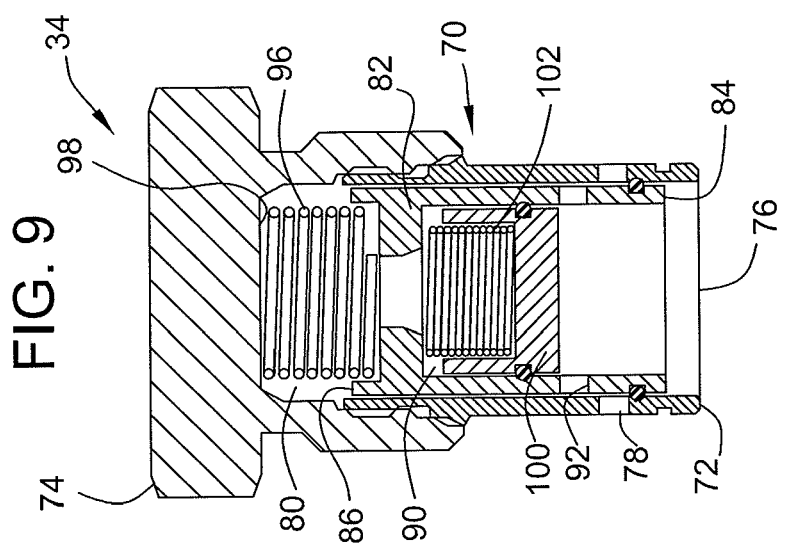
FIG. 7 is a side cross-sectional view of another embodiment of the automatic bleed valve in a closed position.
Figure 8:
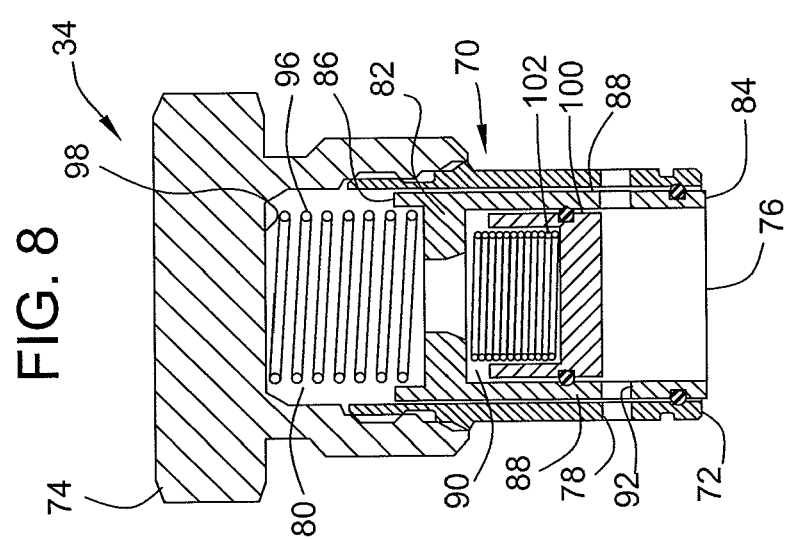
FIG. 8 is a side cross-sectional view of the automatic bleed valve of FIG. 7 in an open position.
Figure 9:
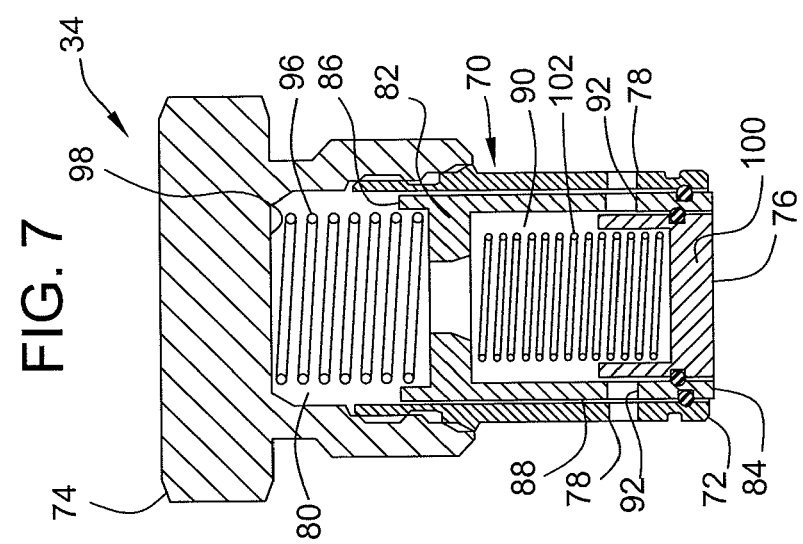
FIG. 9 is a side cross-sectional view of the automatic bleed valve of FIG. 7 in a closed position.

Referring to FIGS. 7-9, another embodiment of the bleed valve 34 is shown. The bleed valve 34 is in the first-closed position in FIG. 7, the open position in FIG. 8, and the second-closed position in FIG. 9. In addition to the features of the embodiment illustrated in FIGS. 3-6, the bleed valve 34 illustrated in FIGS. 7-9 includes a second plunger 100 and a second biasing spring 102. The second plunger 100 and second spring 102 are both located in the bore 90 of the first plunger 82. The second spring 102 has a small spring constant relative to the first spring 96.

As shown in FIG. 7, when the fuel pressure at the inlet 76 is in the first pressure range, both springs 96 and 102 are generally relaxed and both plungers 82 and 100 are generally flush with the second end 72 of the valve body 70. The bleed valve 34 is in the first-closed position at this pressure because the second plunger 100 closes the inlet 76 and prevents flow to the passage 92, which is inline with the outlet 78 when the bleed valve 34 is in the first-open position. Because of the relatively small magnitude of its spring constant, the second spring 102 gradually contracts and the second plunger 100 retracts into the bore 90 when the fuel pressure at the inlet 76 increases to the second pressure range. However, the first spring 96, because of the relatively large magnitude of its spring constant, does not retract and the passage 92 and the outlet 78 remain inline with each other. Accordingly, as shown in FIG. 8, when the fuel pressure at the inlet 76 is in the second, higher pressure range, the passage 92 and the outlet 78 remain inline and the second plunger 100 retracts to a position above the passage 92. This allows fuel to flow from the inlet 76 through the passage 92 and the outlet 78. As shown in FIG. 9, when the fuel pressure at the inlet 76 is in the third, yet higher pressure range, the first spring 96 contracts, causing the first plunger 82 to retract into the chamber 80, moving the passage 92 to a position axially above, and out of fluid communication with, the outlet 78. Here, the bleed valve is in the second-closed position and no fluid communication exists between the inlet 76 and the outlet 78.

INDUSTRIAL APPLICABILITY

The industrial applicability of the system 10 described herein will be readily appreciated from the foregoing discussion. The system 10 of the present disclosure may be associated with any type of machine engine, such as internal combustion type engines, that operate in various types of host systems. For example, the system 10 may be affiliated with an engine associated with a host system such as a marine vehicle, a land vehicle, and/or an aircraft. Further, the system 10 may be associated with an engine operating in a non-vehicle based host system, such as machines operating within a manufacturing plant or generator sets. Accordingly, it will be appreciated that the system 10 may be associated with any type of host system that includes various types of engines that may operate in different environments.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A bleed valve fluidly connected to a fuel line for automatically bleeding air or vapor from the fuel line, the bleed valve comprising:
    a cylindrical valve body, comprising:
        first and second ends;
        a cylindrical chamber located between the first and second ends;
        an inlet formed in the first end of the valve body and fluidly connected to the fuel line; and
        an outlet formed in the valve body between the first and second ends;
    a cylindrical plunger slideably positioned in the chamber, the plunger comprising:
        first and second ends;
        an outer surface;
        a bore formed in the first end of the plunger and in fluid communication with the inlet of the valve body; and
        a passageway extending between the bore and outer surface of the plunger;
    a biasing spring disposed in the chamber, proximate to the second end of the valve body, the biasing spring configured to bias the plunger toward the first end of the valve body;
    wherein the plunger is movable in the chamber between first, second, and third positions, the plunger is in the first position when the passageway of the plunger is positioned axially below the outlet of the valve body, the plunger is in the second position when the outlet of the valve body and the passageway of the plunger are in fluid communication, the plunger is in the third position when the passageway of the plunger is positioned axially above the outlet of the valve body and the plunger blocks flow through the outlet of the valve body; and
    wherein the plunger is in the first position when the fuel pressure in the fuel line is in a first pressure range, the plunger is in the second position when the fuel pressure in the fuel line is in a second pressure range greater than the first pressure range, and the plunger is in the third position when the fuel pressure in the fuel line is at any pressure greater than the second pressure range.

2. A fluid system, comprising:
    a tank;
    a pump configured to draw fluid from the tank and provide fluid flow to the system;
    an automatic bleed valve, and
    a return passage fluidly interconnecting the automatic bleed valve and the tank;
    the automatic bleed valve configured to close when fluid pressure is in a first pressure range for preventing the fluid from entering the return passage,
    the automatic bleed valve configured to open when fluid pressure is in a second, higher pressure range for permitting air or vapor to enter the return passage and flow to the tank,
    the automatic bleed valve configured to close when fluid pressure is in a third, still higher pressure range.

3. The fluid system of claim 2, wherein fluid pressure is the fluid pressure at an inlet of the automatic bleed valve.

4. The fluid system of claim 2, wherein the fluid system is a fuel system for delivering fuel to an internal combustion engine.

5. The fluid system of claim 4, further comprising:
a fuel injector,
wherein the pump is fluidly connected between the tank and the fuel injector, the automatic bleed valve is fluidly connected between the pump and the fuel injector, and the return passage fluidly interconnects the automatic bleed valve and the tank so as to bypass the fuel injector.

6. The fuel system of claim 5, wherein the return passage bypasses a pressure regulating valve.

7. The fuel system of claim 2, wherein the first pressure range is between 0 and 5 psi, the second pressure range is between 5 and 30 psi, and the third pressure range is greater than 30 psi.

8. A bleed valve fluidly connected to a fuel line for automatically bleeding air or vapor from the fuel line, the bleed valve comprising:
a valve body having first and second ends, the valve body comprising:
a first chamber;
an inlet formed in the first end of the valve body and fluidly connected to the fuel line, and
an outlet, and
a first plunger slideably positioned in the first chamber and having first and second ends and an outer surface, the first plunger comprising:
a bore formed in the first end of the first plunger and in fluid communication with the inlet of the valve body, and
a passage extending between the bore and outer surface of the first plunger;
wherein the bleed valve is movable between a first-closed position, an open position, and a second-closed position; and
wherein the bleed valve is in the first-closed position when the fuel pressure at the inlet of the valve body is between 0 and approximately 5 psi, the bleed valve is in the open position when the fuel pressure at the inlet of the valve body is between approximately 5 and approximately 30 psi, and the bleed valve is in the second-closed position when the fuel pressure at the inlet of the valve body is at any pressure greater than approximately 30 psi.

9. The bleed valve of claim 8, wherein the bleed valve is in the first-closed position when the passage of the first plunger is positioned axially below the outlet of the valve body, the bleed valve is in the open position for bleeding air or vapor from the fuel line when the outlet of the valve body and the passage of the first plunger are in fluid communication, and the bleed valve is in the second-closed position when the passage of the first plunger is positioned axially above the outlet of the valve body.

10. The bleed valve of claim 8, further comprising:
a first spring element disposed in the first chamber, proximate to the second end of the valve body, the first spring element configured to bias the first plunger toward the first end of the valve body.

11. The bleed valve of claim 10, further comprising:
a second plunger slideably positioned in the bore of the first plunger.

12. The bleed valve of claim 11, further comprising:
a second spring element disposed in the bore of the first plunger configured to bias the second plunger toward the first end of the valve body.

13. The bleed valve of claim 12, wherein the bleed valve is in the first-closed position when the second plunger closes off the inlet of the valve body.

14. The bleed valve of claim 12, wherein the bleed valve is in the open position when the second spring element is compressed and the second plunger is retracted into the bore allowing fuel to pass through passage of the first plunger and the outlet of the valve body.

15. The bleed valve of claim 12, wherein the bleed valve is in the second-closed position when the first spring element is compressed and the first plunger retracts into the chamber closing off the outlet of the valve body.

16. The bleed valve of claim 8, wherein the outlet of the valve body is in fluid communication with a return passage.

17. The bleed valve of claim 16, wherein the return passage is in fluid communication with a fuel tank.

18. A method of regulating a fluid system, comprising:
pumping fluid from a tank to the fluid system;
preventing fluid from draining back to the tank through a first valve when the fluid pressure is below a second range;
allowing fluid to drain back to the tank through the first valve when the fluid pressure is in the second pressure range;
preventing fluid from draining back to the tank through the first valve when the fluid pressure is above the second range; and
maintaining the fluid pressure at a value above the second range by utilizing a second valve.

* * * * *